Figure 3:
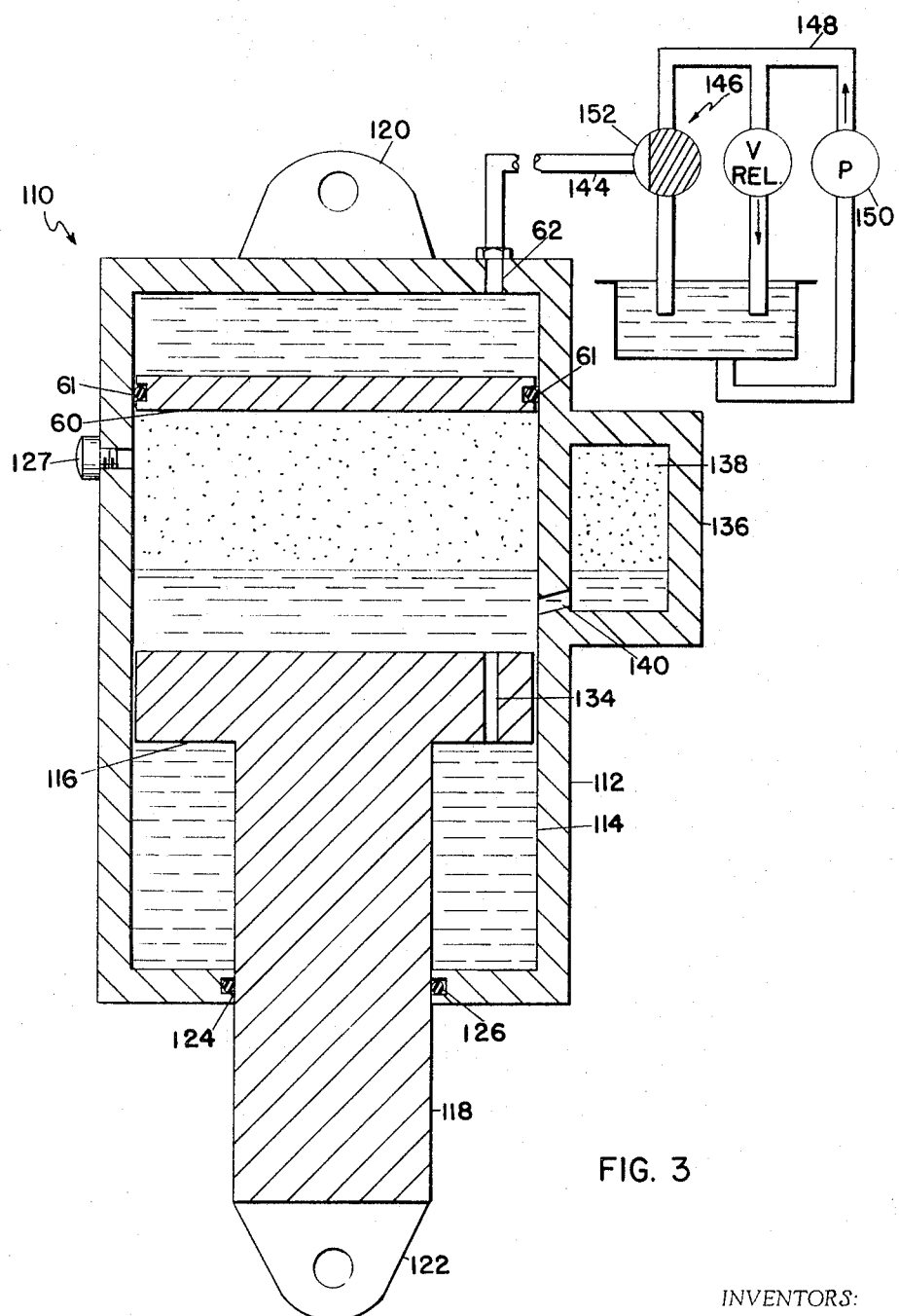

Feb. 14, 1967    L. E. EATON ET AL    3,304,077
SUSPENSION UNIT
Filed Dec. 31, 1964    2 Sheets-Sheet 1
FIG. 1
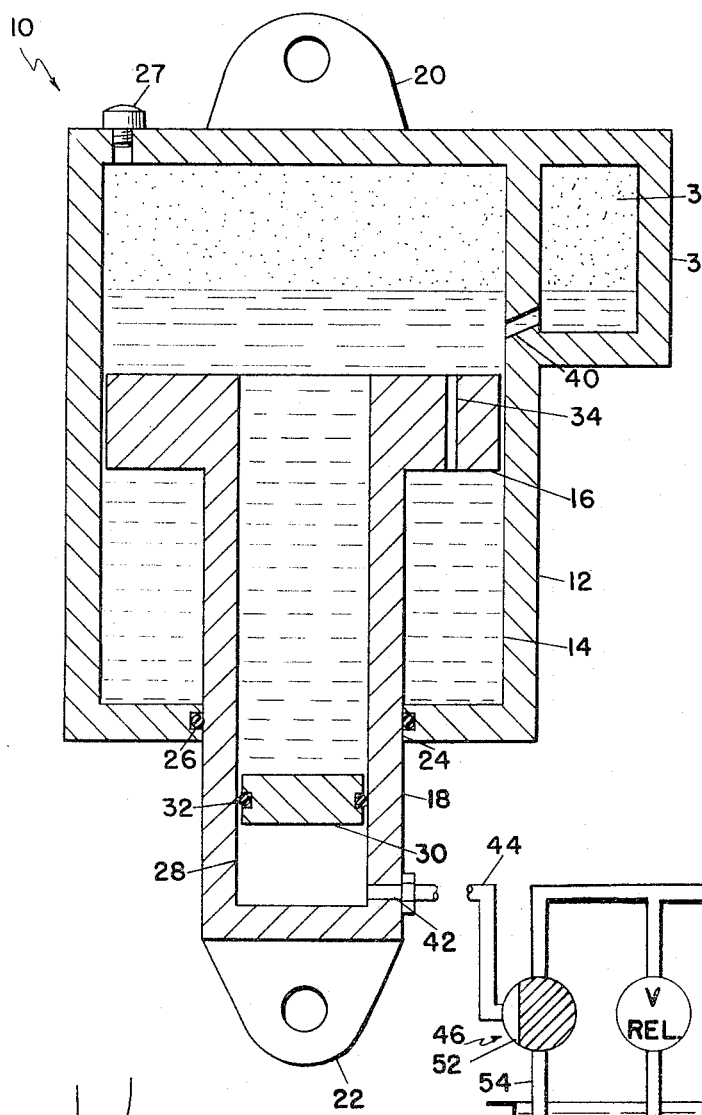
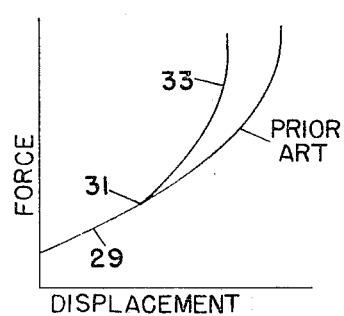
FIG. 2
INVENTORS:
LYLE E. EATON
JOHN M. DICKERSON
RONALD C. KAMP Feb. 14, 1967   L. E. EATON ET AL   3,304,077
SUSPENSION UNIT Filed Dec. 31, 1964   2 Sheets-Sheet 2

INVENTORS:
LYLE E. EATON
BY JOHN M. DICKERSON
RONALD C. KAMP
ATTORNEY

United States Patent Office 3,304,077
Patented Feb. 14, 1967

3,304,077
SUSPENSION UNIT
Lyle E. Eaton, Pekin, Ill., and John M. Dickerson, Media, Pa., assignors to LeTourneau-Westinghouse Company, Peoria, Ill., a corporation of Illinois
Filed Dec. 31, 1964, Ser. No. 422,715
9 Claims. (Cl. 267—64)

The present invention relates generally to suspension units for vehicles, and more particularly to vehicle suspension units of the hydro-pneumatic type which function both as a spring and a shock absorber or damper.

It has been proposed in the past to make a suspension device which functions both as a spring and as a damper, wherein the elasticity of a compressible fluid or gas is utilized to absorb the load imposed thereon and the viscosity of an incompressible fluid or liquid is utilized to provide the required damping. One of the advantages of such a hydro-pneumatic suspension device is that the spring rate, i.e., the amount of force necessary to result in a given displacement or collapse of the device, is not constant but inherently increases as the displacement increases. Such a characteristic provides a stable vehicle due to the fact that the spring rate increases as the sprung mass, i.e., the residual load or force imparted to the suspension system, becomes larger. However, this inherently non-linear force-to-displacement characteristic has definite limitations. For example, when the amount of travel or displacement is restricted by the configuration of the vehicle, it is impossible with prior suspension devices to limit the travel of the unit and still provide satisfactory spring rate over a major portion of the permissible travel. This problem frequently exists in rapid transit vehicles wherein a smooth comfortable ride dictates a low spring rate, but the physical configuration of the vehicles requires a short amount of travel, often on the order of two or three inches.

In addition, it is often necessary or desirable to change the ground clearance or to level the vehicle, e.g. a rapid transit car, with respect to a third object, for example a loading platform. Since the height of the platform from the tracks may vary from station to station, and because the residual load on the suspension system changes with the ingress and egress of passengers, there is a definite need for a means to adjust the elevation of the sprung mass.

It is, therefore, an object of this invention to provide a suspension unit for a vehicle which is capable of changing the ground clearance thereof, which is capable of adjusting the elevation of the vehicle relative to an exterior and unrelated object, and which adjustment is not a function of or dependent on the residual load carried by the vehicle.

It is another object of this invention to provide a suspension device which will achieve a low spring rate within the range of a relatively short travel.

These and other objects and many of the attendant advantages will become more readily apparent from a perusal of the following specification and the accompanying drawing wherein:

FIG. 1 is a cross-sectional view in elevation of a suspension unit embodying the features of the present invention, FIG. 2 is a load-displacement graph showing the curve produced by prior art devices and that produced by the present invention, and FIG. 3 is a cross-sectional view, similar to FIG. 1, showing another embodiment of the present invention.

Referring now in detail to FIG. 1, there is shown a suspension unit, indicated generally at 10, comprising a cylinder 12 having a bore 14, and a piston 16 having a rod portion 18 slidable within the bore 14. The clearance between piston 16 and the bore 14 is exaggerated in the drawing for purposes of illustration. An eye 20 is attached to the free end of the cylinder 12 and a similar eye 22 is attached to the rod portion 18 to permit the unit to be pinned to the sprung and unsprung elements of a vehicle. The rod portion 18 extends through an opening 24 formed in the cylinder 12, and a suitable seal 26 in the cylinder 12 engages the rod portion 18 to prevent loss of fluid from the cylinder. A valve means 27 is provided on the head end of the cylinder 12 and is utilized to charge the bore 14 with a relatively inert gas, such as nitrogen. A blind bore 28 is provided in the piston 16 and the rod portion 18 with its open end adjacent the free face of the piston 16. A floating piston 30 is mounted within the bore 28 and carries sealing means 32 for engagement with the walls of the bore 28. An orifice 34 is provided through the piston portion 16 and functions in a manner to be explained hereinafter. An enclosed container 36, which may be formed integral with the cylinder 12, as shown in FIG. 1, or as an entirely separate unit, forms a chamber 38. Conduit means 40 extends between the interior of the cylinder 12 and the chamber 38, providing free fluid communication therebetween. The point at which the conduit means 40 communicates with the bore 14 in the cylinder 12 is positioned so that the piston 16 will pass by and close off the conduit means 40 as the unit 10 is collapsed. The location of the aforementioned point will determine the amount of upward travel, as viewed in FIG. 1, the piston 16 will undergo at a low spring rate. The curve of FIG. 2 graphically illustrates this. A hydropneumatic unit having a given volume of compressible fluid will follow the curve 29. At point 31, the conduit means 40 is closed off and the spring rate or slope of the graph increases as seen at 33.

An opening 42 is provided in the rod portion 18 near the closed end of the blind bore 28. A conduit 44 connects the opening 42 with a directional control valve 46, which has a sector passage 52 therethrough. A pump 50, arranged in a customary manner with a relief valve and a reservoir, has its output directed through a conduit 48 which connects with the valve 46. Another conduit 54 extends from the valve 46 to the reservoir. In the position shown in FIG. 1, the sector passage is positioned so that all conduits 44, 48 and 54 are closed off and the pump output is dumped through the relief valve back to the reservoir. The valve 46 can be rotated clockwise, as viewed in FIG. 1, until the conduits 48 and 44 are in communication through the passage 52, which will permit the pump 50 to force fluid into the blind bore 28. As the amount of fluid within the blind bore 28 increases, the floating piston will be forced upward displacing fluid from the upper portion of the blind bore and thereby raising the level of fluid within the bore 14. As this level rises, the pressure of the compressible fluid in the head chamber will temporarily increase. The increased pressure will extend the unit 10, i.e., cause the piston 16 to move away from the head end of the cylinder 12, until the pressure therein again is just sufficient to support the load. Counterclockwise rotation of the valve 46 will connect the conduits 44 and 54 while sealing off conduit 48. In this position, the conduit 44 will be connected to the reservoir through the passage 52 and the conduit 54. The pressure of the compressible fluid acting on the floating piston 30 through the non-compressible fluid will force the floating piston downward, as viewed in FIG. 1, and thereby eject the fluid from the blind bore 28 below the floating piston 30 into the reservoir. As the floating piston moves downward, the volume of non-compressible fluid within the bore 14 will decrease resulting in a larger space which the compressible fluid can occupy. The pressure is thereby momentarily reduced allowing the unit 10 to collapse, i.e., the distance between the eyes 20 and 22 will shorten. Thus, it can be seen that the overall length of the unit 10 can be varied by selectively positioning the valve 46, to thereby regulate the position of the floating piston 30 within the blind bore 28.

*Operation of the FIG. 1 embodiment*

It can be seen that collapsing the unit 10, i.e., moving the piston 16 upward as viewed in FIG. 1, will result in a compression of the gas above the piston 16 and within the bore 14, and will also achieve compression of the gas within the chamber 38. However, when the piston 16 is displaced an amount sufficient to pass by and close off the opening 40, any further upward movement of the piston will result in compression of the gas within the bore 14 only. The effect of eliminating a portion of the gas volume which is being compressed by collapse of the unit is to appreciably increase the spring rate of the unit. Thus, it can be seen that with small displacements a low spring rate is achieved and after a certain predetermined amount of displacement the spring rate becomes much higher. On rebound, i.e., as the unit begins to extend, because of a decrease in the load, the high pressure of the compressed gas above the piston 16 tends to force the piston downward. However, the fluid below the piston, being incompressible, will permit downward movement of the piston only to the extent that the fluid below the piston is permitted to flow through the orifice 34 to the upper portion of the bore 14. The size of the orifice 34 is, therefore, selected to provide fluid flow from one side of the piston 16 to the other at a rate which will provide the desired amount of damping.

Turning now to a consideration of the means for varying the effective length of the unit, it can be seen that the position of the floating piston 30 within the bore 28 will determine the amount of fluid present within the cylinder 12 itself. As the floating piston 30 is raised, some of the incompressible fluid contained within the blind bore 28 is forced into the cylinder 12 above the piston. Assuming the load on the unit remains constant, the pressure in the compressible fluid will increase, forcing the piston 16 downward and thereby increasing the distance between the eyes 20 and 22. Conversely, if the floating piston 30 is lowered, the amount of incompressible fluid within the cylinder 12 proper will be decreased by the increased amount contained by the blind bore 28. The pressure of the compressible fluid will decrease and the load imposed on the unit 10 will cause it to collapse until the compressible fluid has again reached the pressure necessary to support the load. The position of the floating piston 30 within the blind bore 28 is controlled by the source of fluid under pressure. Normally, this fluid is incompressible, and therefore, has virtually no effect on the spring rate of the unit 10. A compressible fluid could be utilized, however, with the pump and reservoir being replaced with a compressor and a tank. In that case, collapse of the unit would result in the compressible fluid below the floating piston contributing to an even lower spring rate.

With either type of fluid, the volume or amount of fluid admitted to the blind bore 28 through the conduit 44 and the opening 42 will control the position of the floating piston and the degree of extension of the unit. This in turn will determine the ground clearance of the vehicle, or if desired, position the height of the vehicle with respect to a third object.

*Embodiment of FIG. 3*

Referring now to the embodiment shown in FIG. 3, it will be noted that the unit 110 has a piston 116 slidable in a cylinder 112 in a manner similar to the embodiment shown in FIG. 1. However, the rod portion 118 is solid rather than hollow. Instead, a floating piston 60 having an annular seal 61 is slidably mounted within the bore 114 of the cylinder 112 and above the free face of the piston 116. An opening 62 is formed through the cylinder wall and is connected by means of a conduit 144 to a valve 146 and a pump 150 in a manner similar to that described in connection with FIG. 1. The charging valve 127 has been relocated to permit charging the space between the floating piston 60 and the level of the liquid with an inert gas.

*Operation of the FIG. 3 embodiment*

In this embodiment, the spring action and damping features are identical with those of the embodiment shown in FIG. 1. Similarly, the control of the degree of extension of the unit 110 is achieved by admitting fluid to or dumping fluid from the cylinder 112 above the floating piston 60. To increase the length of the unit 110, the valve 146 is rotated to permit fluid to flow through the conduit 144 into the cylinder 112. This forces the floating piston 60 downward, as viewed in FIG. 3, momentarily increasing the pressure in the compressible fluid. If the load remains constant, the unit will extend until the pressure has reached a level capable of supporting that load. To decrease the length of the unit 110, the valve 146 is rotated to vent the conduit 144 to tank. Fluid will be forced out of the cylinder 112 by movement of the floating piston 60, thereby permitting the overall length of the unit to shorten.

It is to be understood that various modifications and changes can be made within the scope of the present invention, which is defined by the appended claims.

Having described two embodiments of the invention, what is claimed is:

1. A suspension unit for a vehicle comprising:
 a cylinder,
 a first piston having a rod portion reciprocably retained in the cylinder,
 the first piston and the rod portion defining with the cylinder a head chamber and a rod chamber,
 orifice means providing fluid communication between the head and rod chambers,
 a floating piston reciprocably retained in one of said first piston and said cylinder and forming a third chamber therewith,
 the rod chamber being filled with a non-compressible fluid,
 the head chamber being filled with a non-compressible fluid,
 a compressible fluid under pressure,
 a source of variable fluid pressure, and
 means connecting said source of variable fluid pressure to the third chamber, whereby the length of said unit can be increased and decreased by respectively increasing and decreasing the volume of fluid admitted to the third chamber.

2. A suspension unit according to claim 1 wherein the first piston has a blind bore and the floating piston is reciprocably retained therein.

3. A suspension unit according to claim 1 wherein the floating piston is reciprocably retained in the cylinder opposite the free face of the first piston.

4. A suspension unit according to claim 1 and further comprising a charge valve attached to the cylinder whereby compressible fluid under pressure can be injected into and released from the head chamber.

5. A suspension unit for a vehicle comprising:
 a cylinder,
 a first piston having a rod portion reciprocably retained in the cylinder,
 the first piston and the rod portion defining with the cylinder a head chamber and a rod chamber, orifice means providing fluid communication between the head and rod chambers, a floating piston reciprocably retained in one of said first piston and said cylinder and forming a third chamber therewith, the rod chamber being filled with a non-compressible fluid, the head chamber being filled with a non-compressible fluid, and a compressible fluid under pressure, and means for connecting a source of variable fluid pressure to the fluid chamber, whereby the length of said unit can be increased and decreased by respectively increasing and decreasing the volume of fluid admitted to the third chamber, a fourth chamber containing a compressible fluid, conduit means connecting the fourth chamber to the cylinder, the conduit means communicating with the cylinder at a predetermined distance above the first piston when in a neutral position, whereby collapse of said unit causes compression of the compressible fluid in both the head and fourth chambers until the first piston passes and blocks off the conduit means.

6. A suspension unit for a vehicle comprising:

a cylinder, a first piston having a rod portion reciprocably retained in the cylinder, the first piston and the rod portion defining with the cylinder a head chamber and a rod chamber, an orifice in the first piston providing fluid communication between the head and rod chambers, the first piston and the rod portion having a bore one end of which is in communication with the head chamber and the other end of which is sealed, a second piston slidable within the bore, the rod chamber being filled with a non-compressible fluid, and a compressible fluid under pressure, conduit means attached to the rod portion and in fluid communication with the bore adjacent said sealed end, and a source of variable fluid pressure connected to said conduit, whereby the overall length of said unit can be varied by controlling the position of the second piston in the bore.

7. A suspension unit for a vehicle comprising:

a cylinder, a piston having a rod portion reciprocably retained in the cylinder, the piston and the rod portion defining with the cylinder, a head chamber and a rod chamber, an orifice in the piston providing restricted fluid communication between said head and rod chambers, a third chamber, and means for providing free fluid communication between the head chamber and the third chamber, the rod chamber being filled with a non-compressible fluid, each of said head and third chambers being filled with a non-compressible fluid and a compressible fluid under pressure, the point of fluid communication of said means in the cylinder being a predetermined distance above the piston when in a neutral position, whereby collapsing of the piston and the cylinder causes compression of the compressible fluid in both said head and third chambers until the piston passes over and blocks off said means so that further collapse of said unit results in compression of the compressible fluid in the head chamber only.

8. A suspension unit according to claim 7 and further comprising:

a blind bore in the piston, a floating piston slidably retained within the blind bore, and means for connecting a source of variable fluid pressure to the rod portion and in fluid communication with the blind bore, whereby the length of said unit can be varied by changing the position of the floating piston within the blind bore.

9. A suspension unit according to claim 7 and further comprising:

a floating piston slidably retained with the cylinder opposite said rod portion, and means for connecting a source of variable fluid pressure to the rod portion and in fluid communication with the head end of the cylinder whereby the length of said unit can be varied by changing the position of the floating piston within the cylinder.

References Cited by the Examiner

UNITED STATES PATENTS 2,769,632   11/1956   De Carbon _ _ _ _ _ _ _ _ _ _ _ 267—64

ARTHUR L. LA POINT, *Primary Examiner.*

R. M. WOHLFARTH, *Assistant Examiner.*